United States Patent [19]
Sartain et al.

[11] Patent Number: 6,098,474
[45] Date of Patent: Aug. 8, 2000

[54] ENCLOSURE FOR POSITION TRANSMITTER

[75] Inventors: Brian Earl Sartain, Savage; Richard Alan Schwartz, Faribault, both of Minn.

[73] Assignee: Rosemont Aerospace Inc., Burnville, Minn.

[21] Appl. No.: 08/926,815

[22] Filed: Sep. 9, 1997

[51] Int. Cl.[7] .......................... G01M 19/00; G01D 11/30
[52] U.S. Cl. ...................... 73/865.9; 73/178 R; 137/343; 137/899.2
[58] Field of Search .............................. 73/178 R, 866.5, 73/865.9; 131/343, 356, 377, 899.2; 340/963, 971

[56] References Cited

U.S. PATENT DOCUMENTS

| | | | |
|---|---|---|---|
| 4,275,593 | 6/1981 | Thornton-Jump | 73/454 |
| 4,336,721 | 6/1982 | Curtis | 73/863.11 |
| 4,378,697 | 4/1983 | DeLeo et al. | 73/861.65 X |
| 4,549,706 | 10/1985 | Shikney | 73/861.61 X |
| 4,730,487 | 3/1988 | DeLeo et al. | 73/182 |
| 4,821,566 | 4/1989 | Johnston et al. | 73/178 R |
| 5,046,360 | 9/1991 | Hedberg | 73/861.68 X |
| 5,178,022 | 1/1993 | Tomlin | 73/804.81 |
| 5,433,865 | 7/1995 | Greene | 73/180 |
| 5,458,008 | 10/1995 | Rossett | 73/861.65 X |
| 5,601,254 | 2/1997 | Ortiz et al. | 73/861.65 X |

OTHER PUBLICATIONS

Letter dated Nov. 7, 1995 to Northwest Airlines, Inc. from Rosemount Aerospace Inc. (portions redacted).
Figure 2 of Rosemount Aerospace Model 0070J Flap Position Transmitter from Rosemount Aerospace Proposal No. D9520346 for Northwest Airlines DC–9 Aircraft on Sale by Nov. 1995.
Rosemount Aerospace Inc. Specification Drawing 00070–2020, Revision F (portions redacted). by Jun. 1998.

*Primary Examiner*—Thomas P. Noland
*Attorney, Agent, or Firm*—James M. Rashid

[57] ABSTRACT

The present invention relates to a enclosure for a control surface position transmitter used on aerospace vehicles. The enclosure has improved capability for protecting the components of the position transmitter from damage caused by moisture-induced corrosion. The enclosure is a can-shaped structure that includes separate compartments for its mechanical and electronic components. A series of channels and passageways allow air to circulate freely in and out of the mechanical component compartment, and the electronic component compartment includes a low power heater to keep the electronic components dry and moisture-free.

11 Claims, 3 Drawing Sheets

ENCLOSURE FOR POSITION TRANSMITTER

TECHNICAL FIELD

This invention relates to position transmitters, and specifically to control surface position transmitters used on aerospace vehicles. Most specifically, this invention relates to control surface position transmitters that have improved capability for protecting their mechanical and electronic components from damage caused by moisture.

BACKGROUND OF THE INVENTION

Aircraft and other aerospace vehicles utilize a number of control surfaces, such as wing flaps, to achieve their aerodynamic performance. These surfaces are typically moveable by the pilot, and their proper use requires the pilot to have accurate information concerning the surface's actual position relative to the vehicle. Prior art position transmitters used in the aerospace field utilize a combination of mechanical and electronic components sealed within a suitable enclosure to determine the position of the control surface and to provide information to the pilot or the vehicle control systems concerning such position.

As is well known, aerospace vehicles operate in a variety of precipitation, humidity, and altitude conditions. Precipitation and humidity often lead to corrosion, and therefore, prior art position transmitters have tried to seal their mechanical and electronic components inside a hermetic enclosure to prevent such damage. However, the hermetic seals in prior art devices have been observed to fail, and when they do, humid air that passes into the enclosure condenses, causes corrosion damage, and renders the position transmitter inaccurate and eventually unusable. Even minor breaks in the hermetic seal cause problems, especially when the transmitter and the aircraft it is attached to cycles between high and low altitudes characterized by low and high humidity levels, respectively.

Because proper functioning of the position transmitter is crucial for safe operation of the flight vehicle, there has been a longstanding need within the aerospace industry for a enclosure with improved resistance to damage caused by the effects of moist air. The present invention satisfies that need.

SUMMARY OF THE INVENTION

In accordance with the present invention, a control surface position transmitter for use on an aerospace vehicle and having improved resistance to humid-air induced corrosion includes an enclosure that provides separate compartments for mechanical and electronic components, and has a combination of channels and passageways that allow air to circulate in and out of the mechanical compartment and also allow moisture that condenses within the mechanical compartment to be easily removed therefrom; the electronics component compartment is adjacent to the mechanical compartment within the enclosure, and includes a low power heater to insure dry, moisture-free operation of the electronic components.

In one embodiment of this invention, the enclosure comprises: (a) a faceplate having a wall for attaching the enclosure to a support structure of the flight vehicle; (b) a bulkhead for attachment to the faceplate and for defining, in combination with the faceplate, a first compartment; and (c) a cover for attachment to the faceplate and for defining, in combination with the bulkhead, a second compartment; wherein the faceplate includes a cylindrical wall extending transversely and axially from the attachment wall, and adjacent first and second channels that extend circumferentially about the outer surface of the cylindrical wall; and wherein a passageway extends through the second channel and into the first compartment. In this preferred embodiment, the channels cooperate to shed water and other moisture from the surface of the enclosure, and the passageway allows for fluid communication between the first compartment and the environment exterior to the enclosure.

In a preferred embodiment of this invention, mechanical components of a control surface position transmitter are located in the first compartment, and electronic components are located in the second compartment. The electronics compartment is kept dry by a low power electrical heater that provides sufficient energy to aid in evaporating any moisture in such compartment.

Other features and advantages of the present invention will be understood with reference to the best mode for carrying out the invention, described below in combination with the drawings.

BEST MODE FOR CARRYING OUT THE INVENTION

Figure 1:
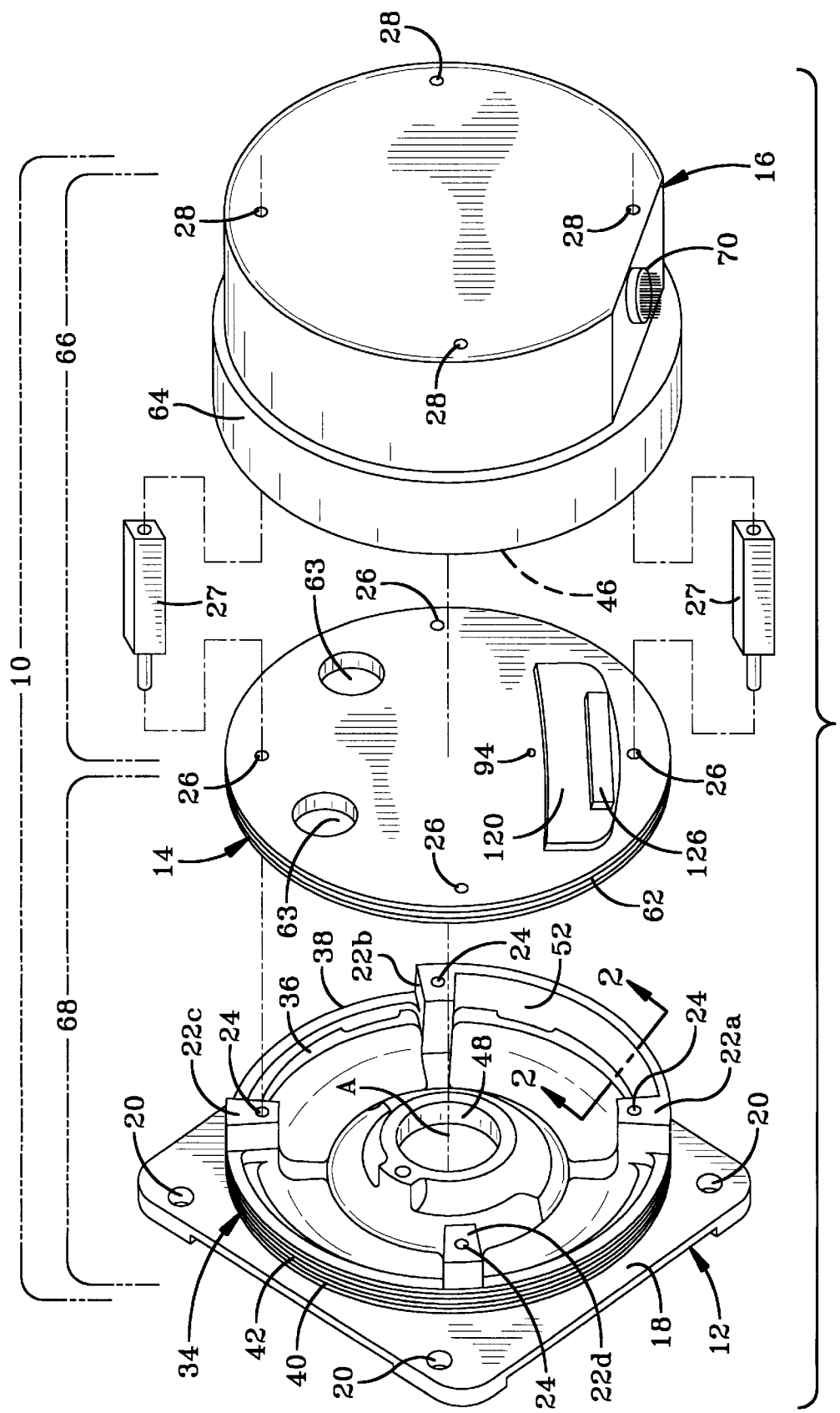
FIG. 1 is an exploded view of the key elements of a enclosure for a position transmitter, in accordance with this invention.

The invention is best understood by reference to FIG. 1 which shows a simplified, exploded view of the primary components of a enclosure 10 for a position transmitter in accordance with the present invention. The enclosure 10 is essentially a compartmentalized, can-shaped structure that comprises a faceplate 12, a bulkhead 14, and a cover 16. The faceplate 12 includes an attachment wall 18 with mounting holes 20 for receiving bolts, screws, or other similar means for attaching the faceplate 12 to a structure of an aircraft or other aerospace vehicle. The faceplate 12 also includes spaced apart bosses 22a, 22b, 22c, 22d, each with a hole 24 for receiving screws, bolts or the like for attaching the bulkhead 14 and cover 16 thereto. The bulkhead 14 has holes 26 that correspond to the holes 24 in the faceplate 12, and the cover 16 has similar, corresponding holes 28. In the preferred embodiment of the invention, bolts (not shown) extend through holes 28 in the top surface 32 of the cover 16, thread into standoffs 27 that pass through corresponding holes 26 in the bulkhead 14; the standoffs 27 thread into the holes 24 in each boss 22a, 22b, 22c, 22d of the faceplate 12.

Figure 2:
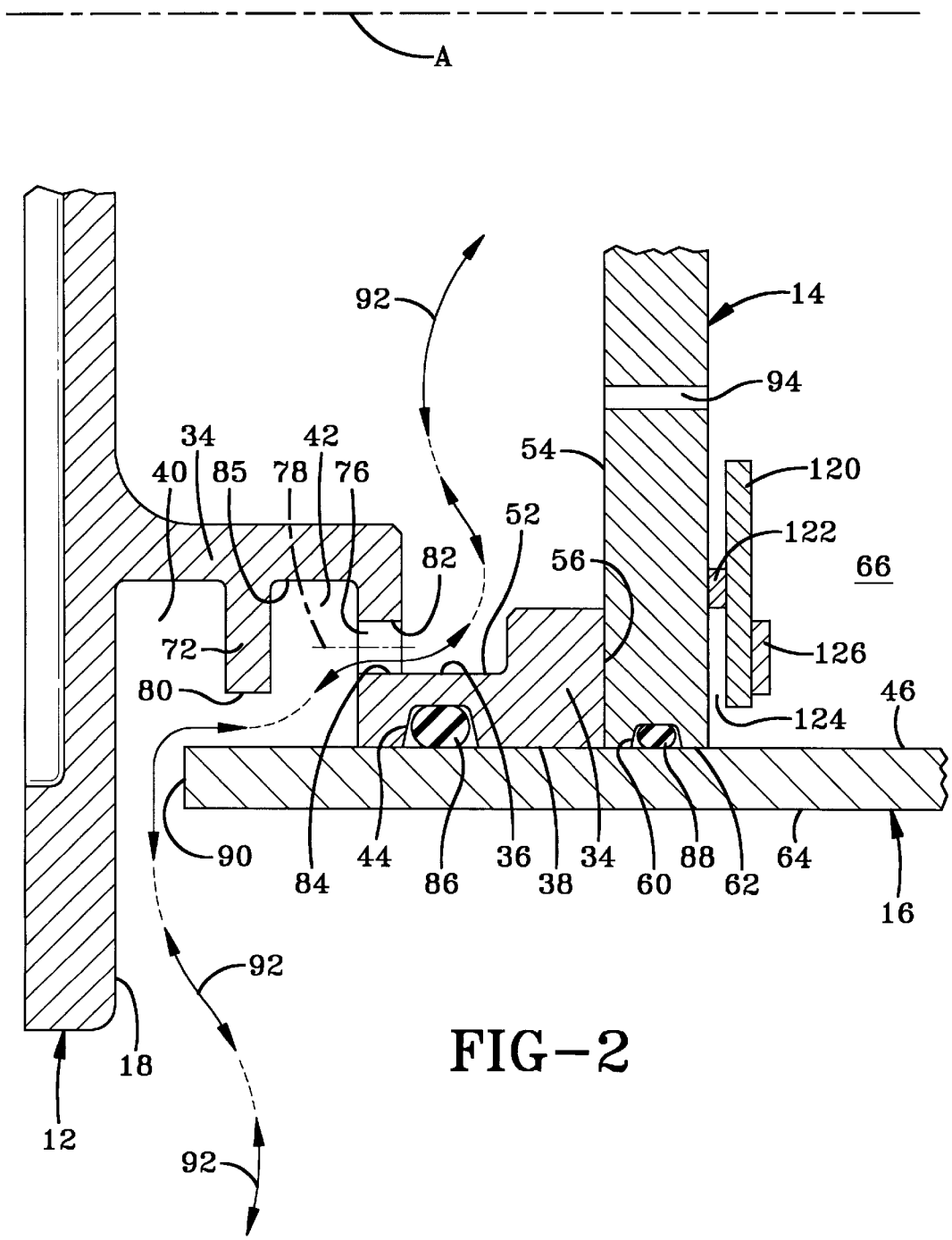
FIG. 2 is a cross sectional view taken along the lines 2—2 of FIG. 1, with the enclosure in a fully assembled condition.

The faceplate 12 includes a cylindrical wall 34 that extends axially from the attachment wall 18. The cylindrical wall 34 has an inner wall surface 36 and an outer wall surface 38. As is also shown in FIG. 2, a first channel 40 extends radially inwardly and circumferentially about the outer surface 38 of the faceplate 12. A second channel 42 is axially adjacent to the first channel 40, and also extends radially inwardly and circumferentially about the outer surface 38 of the faceplate 12. The faceplate additionally includes a groove 44 in its outer surface 38 for receiving an o-ring or other similar seal 86, for sealing against the inner surface 46 of the cover 16 when the faceplate 12, bulkhead 14, and cover 16 are fully assembled. The faceplate 12 further includes a central bore 48 for carrying a bearing (not shown) that supports a shaft 96 (see FIG. 3). As is seen in FIG. 1, between the pair of bosses 22a and 22b, the cylindrical wall 34 of the faceplate 12 extends in the axial direction a greater distance than it does between the bosses 22c and 22d; between bosses 22a and 22b, the wall 34 forms a water collection surface 52. When the bulkhead 14 is attached to the faceplate 12, the surface 54 of the bulkhead 14 is in abutting relationship to the axial end 56 of the water collection surface 52.

The bulkhead 14 is disk-shaped, and includes a groove 60 that extends circumferentially about its outer rim 62 for receiving an o-ring or other similar seal 88; the o-ring 88 abuts against the inner surface 46 of the cover 16 when the faceplate 12, bulkhead 14, and cover 16 are fully assembled. The bulkhead 14 also includes bore holes 63 for mounting position transducers 114 and 118 (see FIG. 3) as described in more detail below.

The cover 16 includes an inner surface 46 and an outer surface 64; as indicated above, the inner diameter of the cover 16 is chosen so that when the cover 16 is assembled to the bulkhead 14 and faceplate 12, the cover inner surface 46 engages the seal 88 in the groove 60 of the bulkhead 14, and the seal 86 in the groove 44 of the faceplate 12. When fully assembled, the cover 16 and bulkhead 14 define a compartment 66 for electronic components (such as the transducers 114 and 118), and the faceplate 12 and bulkhead 14 define a compartment 68 for mechanical components (such as gears 108 and 110, described below.) The cover 16 also includes a conventional, environmentally sealed electrical connector 70 (preferably of the pin-connection type) that allows for communication between electronics in the electronic components compartment 66 and an output transmitter (not shown). The connector 70 is secured to the cover 16 by conventional means.

A key feature of this invention is the manner that it prevents moisture from damaging the components in the mechanical compartment 68 and in the electronic compartment 66. Damage to such parts, caused by moisture, is believed to be a leading cause of failure of prior art position transmitters. The invention achieves its desirable water-protection capability by allowing air to readily enter and exit the mechanical compartment 68 of the enclosure 10. The manner that this is done is better appreciated with reference to FIG. 2, which is a sectional view along the lines 2—2 of the fully assembled enclosure 10 shown in FIG. 1.

As seen in FIG. 2, the first channel 40 in the faceplate 12 is defined at one end by the attachment wall 18, and at the other end by an opposed, axially spaced apart first shoulder 72 that extends radially outwardly from the cylindrical wall 34 of the faceplate 12. The second channel 42 is defined by the first shoulder 72 and an opposed, axially spaced apart second shoulder 74 that extends radially outwardly from the cylindrical wall 34. As is seen in the Figure, the first shoulder 72 is axially intermediate the attachment wall 18 and the second shoulder 74. When the position transmitter 10 of this invention is installed for its intended use, e.g., on an aircraft, the axis A of the enclosure is preferably parallel to the horizontal plane.

A slot 76 extends in the circumferential direction through the second shoulder 74 and provides fluid communication between the mechanical compartment 68 and the ambient atmosphere external to the enclosure 10. Accordingly, air freely passes into and out of the mechanical compartment 68. Preferably, the circumferential length of the slot 76 is greater than its radial width to allow liquid condensate to drain easily from the mechanical compartment 68; slot widths in the range of about 0.5–0.7 inches have been useful, with lengths somewhat greater, to allow water and other liquids to drain from the enclosure interior at a variety of aircraft attitude conditions. The axially extending centerline 78 of the slot 76 is radially inward of the outer end 80 of the first shoulder 72. Preferably the inner and outer surfaces 82 and 84, respectively, of the slot 76 are both inward of the shoulder end 80. As is seen in FIG. 2, the slot surface 82 is outwardly spaced from the portion 85 of the cylindrical wall 34 that lies between first and second shoulders 72 and 74.

When fully assembled, the cover 16 is engaged against the outer surface 38 of the faceplate 12 by the o-ring seal 86 in the groove 44. Additionally, the cover 16 is sealingly engaged against the rim 62 of the bulkhead 14 by the o-ring seal 88 in the groove 60. The use of o-rings is not critical to the invention; other types of sealing means will be useful, as is well known to those with ordinary skill in the art. The axial end 90 of the cover 16 is adjacent to the attachment wall 18 of the faceplate 12, and is between the wall 18 and the first shoulder 72. Because the cover end 90 does not extend all the way to the attachment wall 18, air may readily flow between the wall 18 and cover end 90, past the first shoulder 72, through the slot 76, and into and out of the mechanical compartment 68, as indicated by the arrows 92.

The outer surface 84 of the slot 76 is defined by the water collection surface 52. As a result, if moist air passes into the mechanical compartment 68 and then condenses, the condensate will, by the force of gravity, collect on the water collection surface 52, and flow through the slot 76 and out of the enclosure 10. Additionally, if the enclosure is exposed to fluid spray (e.g., rain, water washings, etc.) then in the unlikely event that water is able to follow the circuitous path shown by arrows 92 into the mechanical compartment 68, the liquid will also simply drain out of the slot 76 under the influence of gravitational forces. In the preferred embodiment of the invention, four slots 76 are spaced about a semicircular sector of the faceplate 12. When the enclosure 10 is installed on an airplane, the circumferential midpoint of one slot 76 is substantially aligned with the vertical direction when the airplane is at rest on the ground.

The slot 76 through the second shoulder 74 therefore performs a dual role: allowing air to freely pass in and out of the mechanical compartment 68, and allowing any liquid, typically in the form of condensate, to easily drain from such compartment. This construction is contrasted with prior art designs, where air is excluded from the compartment by a hermetic seal; however once the seal breaks in these prior art designs, and air is able to leak into the compartment, it is trapped there by the still functioning (albeit not perfectly functioning) seal. If the trapped air contains any moisture, as it likely will, that trapped moisture will eventually cause any metal components in the prior art enclosure compartment to corrode.

As shown in FIG. 2, components in the mechanical compartment 68 are physically isolated, by the bulkhead 14, from the components in the electronic compartment 66. The bulkhead 14 therefore keeps moisture in the mechanical compartment from passing into the electronic compartment. Any moisture that does, however, enter the electronic compartment 66 is evaporated by heater 126 attached to heat sink 124. The heat sink 124 is arc shaped and is attached to a stand-off 122 on the electronics side of the bulkhead 14, so that the heat sink 120 is separated from the bulkhead 14 by a slight air gap 123. The air gap 124 thermally insulates the heat sink 120 from the bulkhead 14. A low wattage heater 126, which draws from the same voltage source (not shown) that powers the electronic components within the enclosure, is thermally coupled to the heat sink 124. During operation of the aircraft, the heater 126 constantly draws power and raises the temperature of the heat sink 120, The heat sink 120 radiates heat into the space within the electronics compartment 66, limiting the condensation of humid air that may find its way into the electronics compartment 66; the heat also vaporizes any moisture that does condense in the electronics compartment 66, which keeps the electronics compartment 66 dry and corrosion free. Optionally, the bulkhead 14 may include a vent hole 94 that allows air to pass between the electronics compartment 66 and the mechanical compartment 68; any humid air in the electronics compartment 66 when the aircraft is on the ground will likely be drawn out of such compartment, through the vent hole 94, as the aircraft takes flight into higher altitudes and lower pressures. Thus, the vent hole 94 assists the electronics compartment 66 in cleansing itself of humid air.

While the enclosure of this invention may have a variety of different uses as a control surface position transmitter, a preferred application is that of a flap position transmitter for an aircraft such as a modem, turbine engine powered airplane. As is well known to those skilled in the art, a flap position transmitter of this sort informs the pilot of the aerodynamic position of the wing flaps, so that they may be adjusted as necessary, during flight. In the typical case, the flap position transmitter includes a rotating shaft that is attached by appropriate linkages to the underside surface of the flap; movement of the flap is either the up or down direction causes the shaft to rotate. Such rotation is then converted, through conventional electronic processing, into a signal indicative of the flap's position that is sent to the pilot in the cockpit.

Figure 3:
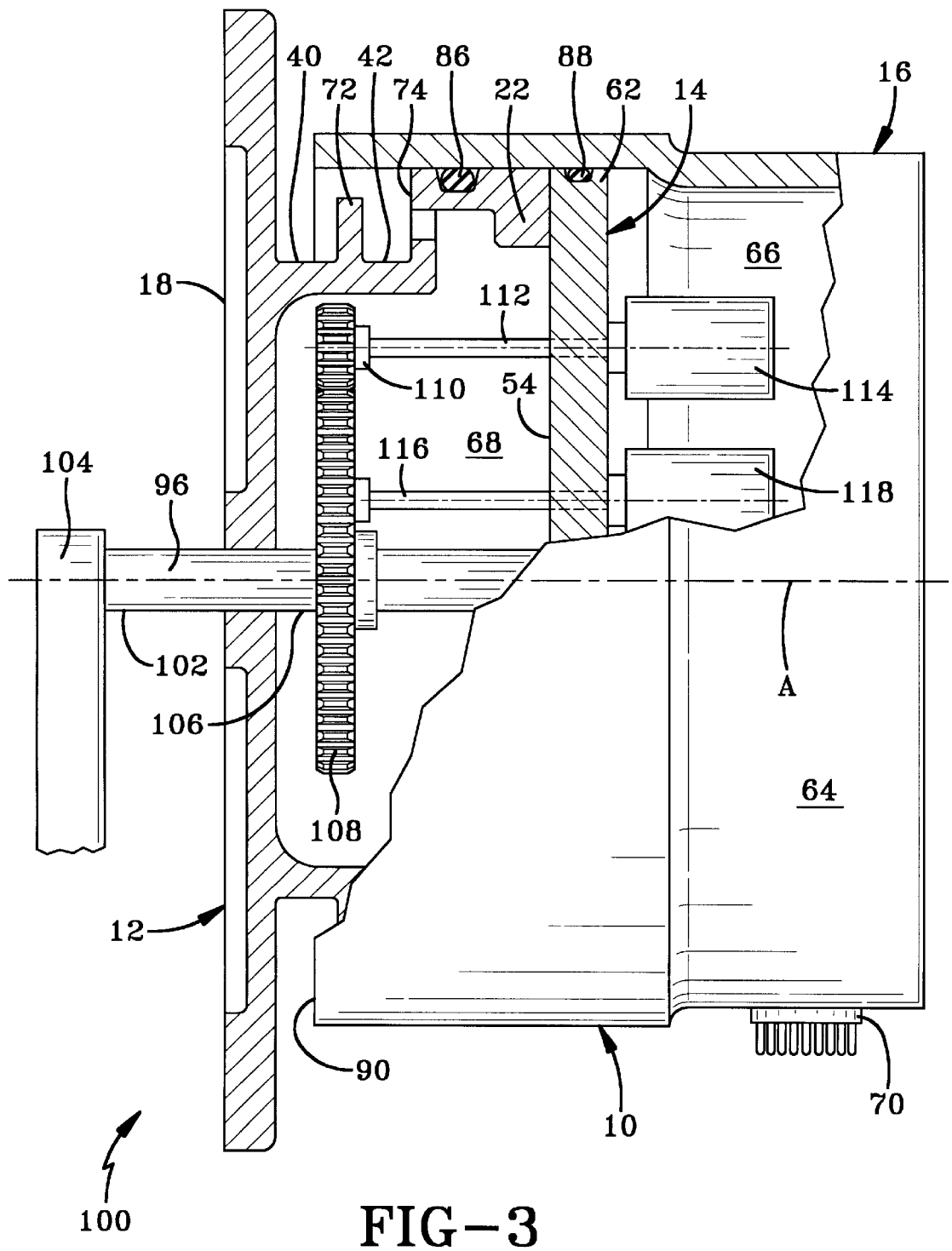
FIG. 3 is a side view, partly broken away, showing a control surface position transmitter in accordance with this invention.

In applications as just described, and as shown in FIG. 3, the shaft 96 of the transmitter 100 extends in the axial direction from the enclosure 10; a first end 102 of the shaft 96 is secured to a flap linkage 104. A second end 106 of the shaft 96 is attached to a main gear 108 that is one of the mechanical components secured within the enclosure 10. The main gear 108 drives additional gears coupled to transducers that convert the rotary motion of the gear to an output voltage signal in the typical fashion; the output voltage is proportional to the amount of rotation of the gear. The main gear 108 drives a pinion gear 110 coupled by shaft 112 to a linear transformer 114. Similarly, the main gear 108 drives another pinion gear (not shown) coupled by shaft 116 to a synchronization transmitter 118. Other pinion gears may also be driven by the main gear 108, depending on the particular function to be performed by the position transmitter. In the embodiment shown in the Figure, the output voltage from the linear transformer 114 is transmitted to the pin connector 70 and then to a computer in the cockpit. This signal informs the pilot of the position of the wing flaps. The signal may also be processed by appropriate electronic circuitry (not shown) within the electronics compartment 66 and sent to relays that are programmed to, e.g., turn on or off warning lights such as the "Fasten Seat Belt" light in the passenger portion of the airplane. The synchronization transmitter performs a similar function as the linear transformer, but instead provides a signal to, e.g., a flight control computer that controls other functions of the airplane that are affected by the position of the control surface.

It should be apparent from the foregoing that the enclosure of this invention is not limited to application as a flap position transmitter. The particular mechanical and electronic components housed therein are not critical aspects of the invention. The enclosure will find numerous uses in operating environments where the components must be kept free of moisture that will invariable and eventually cause corrosion and failure. The enclosure of this invention achieves such desirable characteristics by its use of a cylindrically-shaped faceplate with a plurality of grooves extending about its outer diameter that allow the enclosure to efficiently shed water that collects on the enclosure outer surface; and at least one labyrinth passageway that is constructed and arranged to allow air to freely circulate through the enclosure's mechanical compartment and thereby continually cleanse the compartment of humid air that might otherwise stagnate and condense. If any humid air condenses within the mechanical compartment, the construction of the faceplate and preferred orientation of the enclosure when attached to the aircraft causes the condensate to collect on the water collection surface and flow through the slot and out of the mechanical compartment. The low wattage heater in the electronics compartment keeps the electronics dry and corrosion free.

Although the present invention has been shown and described with respect to a preferred embodiment thereof, workers skilled in the art will recognize that changes can be made in form and detail without departing from the spirit and scope of the invention.

We claim:

1. An enclosure for a component exposed to fluid conditions, comprising:

a faceplate having a wall for attaching said enclosure to a support structure;

a bulkhead for attachment to said faceplate and for defining, in combination with said faceplate, a first compartment; and a cover for attachment to said faceplate and for defining, in combination with said bulkhead, a second compartment;

wherein said faceplate includes a cylindrical wall extending along an axis of rotation transversely to the faceplate attaching wall, and the cylindrical wall has an outer surface, and first and second channels extending radially inwardly and circumferentially about the outer surface; and wherein the first channel is defined by the faceplate attaching wall and an opposed, axially spaced apart first shoulder extending radially outwardly from the cylindrical wall, and the second channel is defined by the first shoulder and an opposed, axially spaced apart second shoulder extending radially outwardly from the cylindrical wall, wherein the first shoulder is axially intermediate the faceplate attaching wall and the said second shoulder and has a radially outer end; and wherein the second shoulder includes a slot extending circumferentially about and axially therethrough, the slot providing fluid communication between the first compartment and atmosphere external to said enclosure, wherein the slot is radially inward of the outer end of the first shoulder.

2. The enclosure of claim 1, wherein said cover is cylindrically shaped and is engaged against the faceplate outer surface.

3. The enclosure of claim 1, wherein said bulkhead has a circumferentially extending outer surface, and said cover is engaged against the bulkhead outer surface.

4. The enclosure of claim 3, wherein said cover is further engaged against the faceplate outer surface.

5. The enclosure of claim 4, wherein the faceplate outer surface and the bulkhead outer surface are radially outward of the slot.

6. The enclosure of claim 5, wherein said cover includes a circumferentially extending end spaced between the faceplate attaching wall and the first shoulder.

7. A control surface position transmitter including mechanical and electronic components, for use on an aerospace vehicle, the transmitter comprising:
- a faceplate for attaching said transmitter to a support structure of the aircraft;
- a bulkhead for attachment to said faceplate and for defining, in combination with said faceplate, a compartment for said mechanical components; and
- a cover for attachment to said faceplate and for defining, in combination with said bulkhead, a compartment for said electronic components;

wherein said faceplate includes a cylindrical wall extending along an axis of rotation transversely to the faceplate attaching wall, and the cylindrical wall has an outer surface, and first and second channels extending radially inwardly and circumferentially about the outer surface; and wherein the first channel is defined by the faceplate attaching wall and an opposed, axially spaced apart first shoulder extending radially outwardly from the cylindrical wall, and the second channel is defined by the first shoulder and an opposed, axially spaced apart second shoulder extending radially outwardly from the cylindrical wall, wherein the first shoulder is axially intermediate the faceplate attaching wall and the said second shoulder, and has a radially outer end; and wherein the second shoulder includes a slot extending circumferentially about and axially therethrough, the slot providing fluid communication between the first compartment and atmosphere external to said enclosure, wherein the slot is radially inward of the outer end of the first shoulder; and wherein said bulkhead has a circumferentially extending outer wall surface, and said cover is engaged against the bulkhead outer surface and against the faceplate outer surface, and wherein the second compartment further includes a heater for heating the space within the compartment above the temperature of the ambient atmosphere.

8. The control surface transmitter of claim 7, wherein the faceplate outer surface and the bulkhead outer surface are both radially outward of the slot.

9. The control surface transmitter of claim 8, wherein said cover includes a circumferentially extending end spaced between the faceplate attaching wall and the first shoulder.

10. The control surface position transmitter of claim 9, wherein said faceplate is constructed and arranged such that on attachment to a support structure of the aerospace vehicle, the slot shoulder is aligned in substantially the vertical direction.

11. The control surface transmitter of claim 10, further comprising:
- a shaft extending through a bore in the faceplate attaching wall and having a first end for linkage to the control surface and a second end engaged to a gear within said mechanical components compartment, wherein movement of the control surface causes rotation of said gear; and a transducer within the electronics compartment and coupled to said gear, wherein said transducer generates a signal indicative of the position of the control surface, the signal being proportional to the amount of rotation of said gear.

* * * * *